United States Patent
Belobraydich et al.

(10) Patent No.: US 12,210,128 B2
(45) Date of Patent: Jan. 28, 2025

(54) GAMMA SOURCE DEVICES AND RELATED SYSTEMS AND METHODS

(71) Applicant: Revvity Health Sciences, Inc., Waltham, MA (US)

(72) Inventors: Michael Belobraydich, Naperville, IL (US); Richard Harazin, Naperville, IL (US); Richard E. Pelc, Naperville, IL (US)

(73) Assignee: Revvity Health Sciences, Inc., Waltham, MA (US)

( * ) Notice: Subject to any disclaimer, the term of this patent is extended or adjusted under 35 U.S.C. 154(b) by 76 days.

(21) Appl. No.: 18/176,683

(22) Filed: Mar. 1, 2023

(65) Prior Publication Data

US 2024/0295665 A1    Sep. 5, 2024

(51) Int. Cl.
*G01T 7/00*    (2006.01)

(52) U.S. Cl.
CPC ...................................... *G01T 7/00* (2013.01)

(58) Field of Classification Search
CPC .................................. G01T 7/00; G01T 7/005
See application file for complete search history.

(56) References Cited

U.S. PATENT DOCUMENTS

| | | |
|---|---|---|
| 9,261,612 B2 | 2/2016 | Inanc et al. |
| 10,310,102 B2 | 6/2019 | Ramsden et al. |
| 2009/0250599 A1 | 10/2009 | Bartlett et al. |
| 2020/0301033 A1 | 9/2020 | Roth et al. |
| 2020/0393391 A1 | 12/2020 | Iyer et al. |

FOREIGN PATENT DOCUMENTS

| | | |
|---|---|---|
| CN | 106569250 B | 3/2019 |
| EP | 1153283 B1 | 7/2011 |
| GB | 1231396 A | 5/1971 |
| JP | H0732557 U * | 6/1995 |

OTHER PUBLICATIONS

International Search Report and Written Opinion for PCT/US2024/017858 mailed May 21, 2024, 18 pages.
Ziegler, Eckert, "Calibration Standards and Instruments", Jul. 1, 2009, Retrieved from the Internet: URL:https:/www.esag.com/fileadim/user_upload/isotopes/isotopes/istroak-pdf/Product_ligerature/EZN/catalogue_isotrak_reference_and_calibration_sources_pdf.

* cited by examiner

*Primary Examiner* — Kiho Kim
(74) *Attorney, Agent, or Firm* — Myers Bigel, P.A.

(57) ABSTRACT

Methods, systems, apparatus, and computer readable program products for determining a count rate linearity of one or more gamma detectors using a single gamma radiation source, by varying the solid angle (and hence the emission rate observed by the detector(s)) between the single gamma radiation source and the one or more detector(s).

20 Claims, 10 Drawing Sheets

GAMMA SOURCE DEVICES AND RELATED SYSTEMS AND METHODS

FIELD

The present technology relates to gamma counters and, more particularly, to systems, apparatus, methods, and computer program products for verifying, assessing, and/or determining whether a gamma counter detector is operating correctly.

BACKGROUND

Gamma counters include detectors that are used to detect and count gamma radiation emitted from solid and liquid samples. Count rate linearity, generally understood to be the relationship of count rate versus emission rate, is a generally known performance characteristic for a given gamma detector. If a gamma detector is not working properly and/or defective (e.g., optical grease too old; sodium iodide crystal deterioration, problem with the counting electronics, etc.), count rate linearity is generally affected, and the performance (e.g., count) of the gamma counter can be unreliable. To increase the likelihood of accurate and robust gamma counter/detector performance, it can be desirable to assess, determine and/or verify the count rate linearity of the gamma counter/detector. This process of assessing, determining or verifying count rate linearity for a given detector can include serially using multiple sources of gamma radiation of different known radioactivity levels/emission rates, and observing the resulting count rates at the detector. This process requires accessibility to multiple sources of gamma radiation of known radioactivity levels/emission rates, which may be difficult in all remote and other gamma counter/detector locations.

SUMMARY

Some embodiments of the present technology are directed to a method of determining the count rate linearity of one or more detectors of a gamma counter. The method includes: providing a gamma source device including a cylinder, a gamma source holder in the cylinder, and a gamma source connected to the gamma source holder, wherein the gamma source holder and the gamma source are configured to be moved to a plurality of different positions in the cylinder; inserting the gamma source device in a detector of the gamma counter with the gamma source at a first position in the cylinder; determining a first count rate of the gamma source with the gamma source at the first position in the cylinder using the gamma counter; moving the gamma source to a second position in the cylinder; and determining a second count rate of the gamma source with the gamma source at the second position in the cylinder using the gamma counter.

In some embodiments, the method includes comparing the first count rate to a first expected count rate and comparing the second count rate to a second expected count rate.

In some embodiments, the method includes, after determining the second count rate: moving the gamma source to a third position in the cylinder; and determining a third count rate of the gamma source with the gamma source at the third position in the cylinder using the gamma counter.

In some embodiments, the method includes comparing the third count rate to a third expected count rate.

In some embodiments, the method includes, after determining the third count rate: moving the gamma source to a fourth position in the cylinder; and determining a fourth count rate of the gamma source with the gamma source at the fourth position in the cylinder using the gamma counter.

In some embodiments, the method includes comparing the fourth count rate to a fourth expected count rate.

In some embodiments, the gamma source holder includes a screw that is threadingly engaged with an inner diameter of the cylinder, and moving the gamma source to the second position includes rotating the screw.

In some embodiments, rotating the screw includes rotating the screw using a hand tool.

In some embodiments, the method includes: after determining the first count rate, removing the gamma source device from the detector; and, after rotating the screw, reinserting the gamma source device in the detector of the gamma counter with the gamma source at the second position in the cylinder.

In some embodiments, rotating the screw includes rotating the screw using a motor operatively connected to the screw.

In some embodiments, the cylinder is transparent or translucent and includes a scale including a plurality of graduations, and moving the gamma source to the second position includes moving the gamma source to one of the plurality of graduations.

In some embodiments, the gamma counter includes a plurality of detectors, and the method includes: inserting the gamma source device into at least some of the plurality of detectors to be tested; and determining count rates with the gamma source at a plurality of different positions in the cylinder for each detector to be tested.

Some other embodiments of the present technology are directed to a gamma source device including: a hollow tube including an inner diameter and an outer diameter, the hollow tube including a first end and an opposite second end; and a gamma source holder in the inner diameter of the tube. The gamma source holder is configured to receive and hold a gamma source. The gamma source holder and the gamma source are configured to be positioned in a plurality of different positions in the tube between the first end and the second end. The outer diameter of the tube is sized such that the gamma source device is configured to be received in a detector of a gamma counter.

In some embodiments, the gamma source holder includes a screw member threadingly engaged with the inner diameter of the tube.

In some embodiments, the screw member includes a first end and an opposite second end, and the first end of the screw member is configured to receive the gamma source.

In some embodiments, the first end of the screw member includes a threaded aperture, and the aperture is configured to threadingly engage the gamma source.

In some embodiments, the second end of the screw member includes a recess configured to receive a tool to rotate the screw member to thereby selectively move the screw member among the plurality of different positions in the tube.

In some embodiments, a motor is operatively connected to the gamma source holder and configured to move the gamma source holder among the plurality of different positions in the tube.

In some embodiments, the gamma source device includes a scale including graduations on the tube, and the graduations correspond to at least some of the plurality of different positions in the tube and represent expected count rates by the detector of the gamma counter.

In some embodiments, the scale includes first and second scales, the first scale including graduations representing expected count rates by a detector of a first type of gamma counter, the second scale including graduations representing expected count rates by a detector of a second type of gamma counter.

In some embodiments, the tube is transparent or translucent to allow a user to view the position of the gamma source through the tube.

In some embodiments, the outer diameter of the tube is between 10 mm and 30 mm.

In some embodiments, the tube has a height or length of between 60 mm and 100 mm.

In some embodiments, the gamma source device includes the gamma source.

In some embodiments, the gamma source includes a barium pellet.

In some embodiments, the tube is polymeric.

In some embodiments, the gamma source device includes or is supplied with an electronic or paper chart providing an expected count rate for the gamma source at each of the plurality of different positions in the tube.

Further features, advantages and details of the present technology will be appreciated by those of ordinary skill in the art from a reading of the figures and the detailed description of the embodiments that follow, such description being merely illustrative of the present technology.

BRIEF DESCRIPTION OF THE DRAWINGS

The accompanying drawings, which form a part of the specification, illustrate embodiments of the technology.

DETAILED DESCRIPTION

The present disclosure alleviates the need for multiple gamma sources of varying radioactivity levels to determine the count rate linearity of a gamma detector(s). The present disclosure is thus based on understanding that a given gamma detector has a given count rate linearity, which is a performance characteristic of the detector characterized by a substantially linearly scaling of the detector's count as the gamma source/emitter's activity disintegrates/decreases. The present disclosure also contemplates that decreased activity, or disintegration of a gamma source/emitter, can be achieved with a single gamma radiation source by varying the solid angle between the gamma radiation source (emitter), and the gamma counter/detector. By varying the solid angle between the gamma source and the gamma counter, gamma sources of varying emission rates at the detector (i.e., from the perspective of the detector) can thus be achieved, using a single source, as disclosed herein, thereby eliminating the need for multiple gamma sources at varying emission rates to be able to determine and/or verify count rate linearity of a detector(s). Accordingly, disclosed are methods, systems, apparatus, and computer readable program products for assessing, determining, and/or verifying gamma detector(s) performance by determining a count rate linearity of one or more gamma detectors using a single gamma radiation source, by varying the solid angle (and hence the emission rate observed by the detector(s)) between the single gamma radiation source and the one or more detector(s). If the expected count rate linearity of a given detector(s) is not as determined by the methods, systems, apparatus, and computer program products disclosed herein, a detector(s) may be deemed defective, and may be repaired or replaced.

In one embodiment, disclosed is a method for determining a count rate linearity of one or more gamma detectors using a single gamma radiation source, where the method includes, for each detector: (i) positioning the single gamma radiation source to create a first solid angle between the single gamma radiation source and each of the one or more gamma detectors, where the first solid angle may be different for each of the one or more gamma detectors, and the respective first solid angle for each of the one or more detectors is associated with a first emission rate; (ii) recording a first count rate of the one or more detectors at the respective first solid angle; (iii) positioning the single gamma radiation source to create a second solid angle between the single gamma radiation source and each of the one or more gamma detectors, where the second solid angle may be different for each of the one or more gamma detectors, and the respective second solid angle for each of the one or more detectors is associated with a second emission rate; (iv) recording a second count rate of the one or more detectors at the respective second solid angle; and, determining the count rate linearity of each of the one or more detectors based on the relationship, respectively, of the first and second recorded count rates to the respective first and second emission rates. In some embodiments, the first and second solid angles may be achieved using a positioning mechanism that may be manually manipulated to create the first and second solid angles, while in embodiments, the first and second solid angles may be created or achieved using a processor with instructions to cause the single gamma radiation device to be positioned to create the first and second solid angles. The processor may communicate via a wired or wireless connection to a positioning mechanism (e.g., controller) that is capable of changing a solid angle relationship between the single gamma source and the one or more detectors. The processor will thus include processor instructions for performing the methods as disclosed herein.

In embodiments, the disclosed methods and systems can include (i) positioning the single gamma radiation source to create a third solid angle between the single gamma radiation source and each of the one or more gamma detectors, where the third solid angle may be different for each of the one or more gamma detectors, and the respective third solid angle for each of the one or more detectors is associated with a third emission rate; (ii) recording a third count rate of the one or more detectors at the respective third solid angle; and, where determining the count rate linearity of each of the one or more detectors is further based on the relationship of the third recorded count rate to the respective third emission rate.

It can be understood that more than three emission rates may be achieved using the methods, systems, apparatus, and computer program products of the present disclosure, and such determining of the count rate linearity may be based on the relationship between more than three achieved emission rates and corresponding recorded count rates, without departing from the scope of the present disclosure.

Accordingly, rather than using multiple gamma sources of varying disintegrations per minute (DPMs), the present technology allows a user to change the solid angle of gamma particles impinging the detector using a single gamma source, thus changing the count rate observed by the detector and its counting electronics, and thus effectively achieving a change in the emission rate of the gamma source. When using the present technology, external pulse generators, special cables, and multiple gamma radiation sources are not required to determine count rate linearity of a gamma detector(s).

Figure 1A:
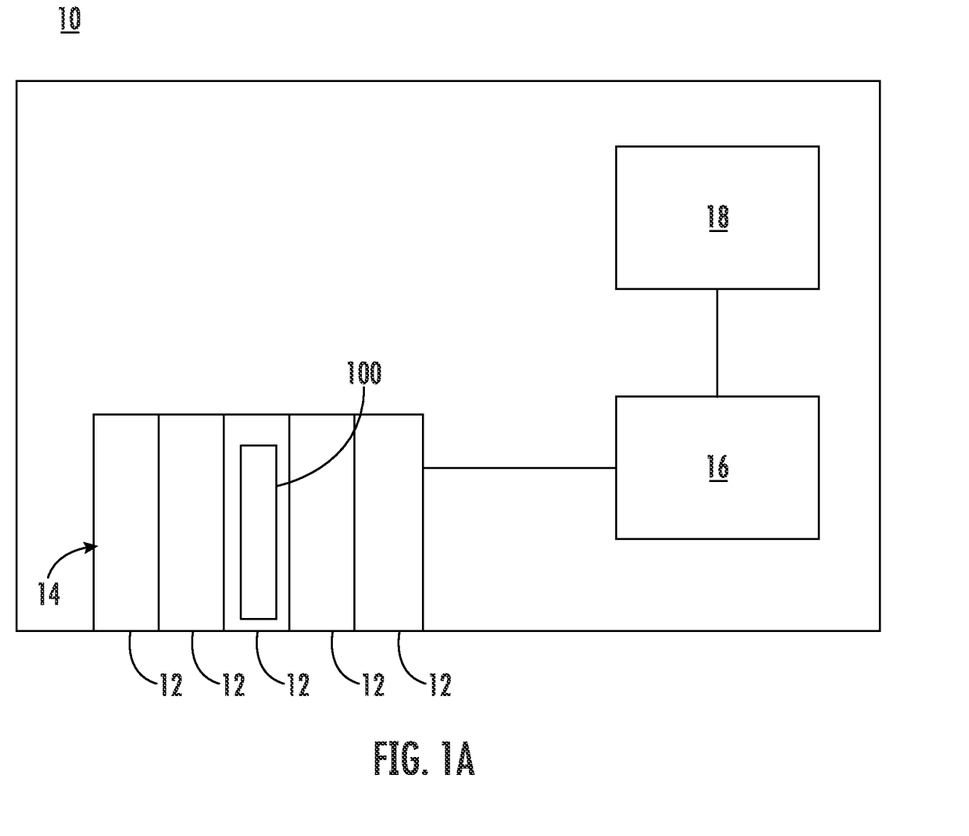
FIG. 1A is a schematic view of a gamma counter system according to some embodiments.

FIG. 1A is a simplified schematic diagram of a gamma counter or gamma counter system 10. The gamma counter 10 includes a plurality of detectors 12, with each detector 12 including a well 14. The gamma counter 10 includes a controller 16 (e.g., processor) operatively associated with the detectors 12 and a display 18. The illustrated gamma counter 10 includes five detectors 12. However, the gamma counter may include a greater or lesser number of detectors (including a single detector in some embodiments).

Figure 1B:
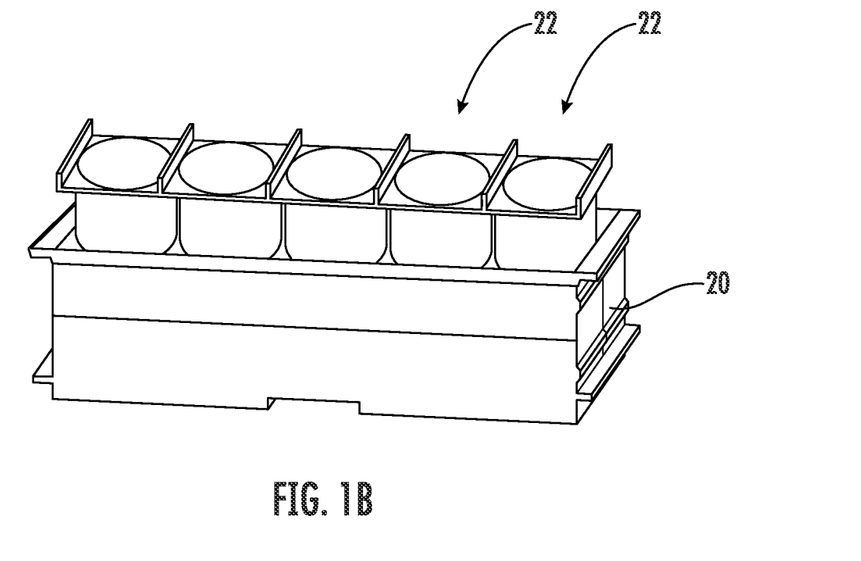
FIG. 1B is a perspective view of a tray holding a plurality of test tube holders.

FIG. 1B is a perspective view of a rack 20 carrying a plurality of test tube holders 22. Referring to FIGS. 1A and 1B, in use, test tubes including solid and liquid samples are placed in the test tube holders 22 and the rack is loaded into the gamma counter 10. The test tube holders 22 are received in the detectors 12 and gamma radiation emitted from the samples is detected and counted (e.g., by the controller 16). The count rate results may be displayed on the display 18.

It may be desirable to determine the count rate linearity of the gamma counter to verify the proper operation of the detectors 12. FIG. 1A shows a single gamma source device 100 according to the present technology in one of the detectors 12. The gamma source device 100 allows a user to determine the count rate linearity using a single gamma source as will now be described.

Figure 2:
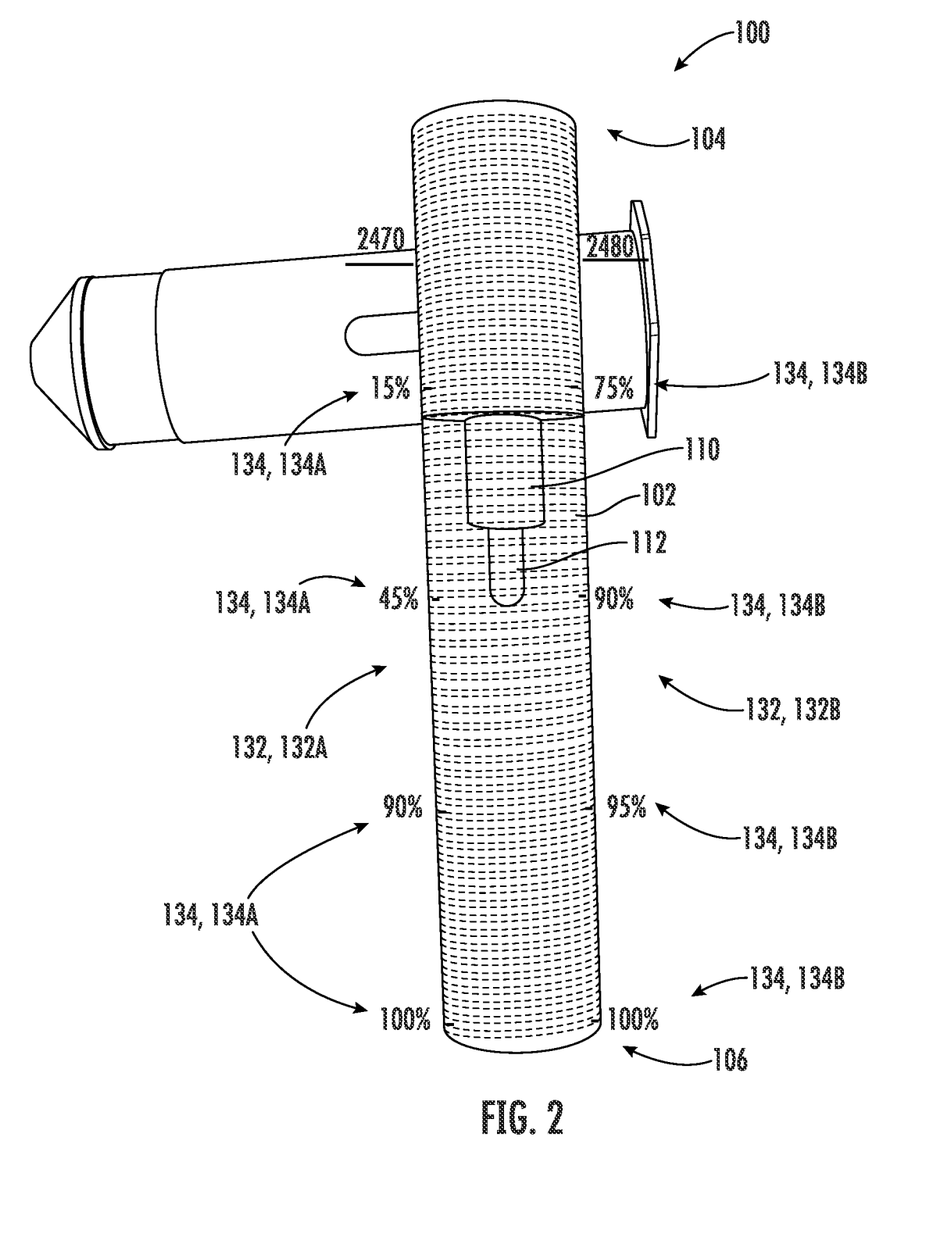
FIG. 2 is a perspective view of a gamma source device according to some embodiments.
Figure 3:
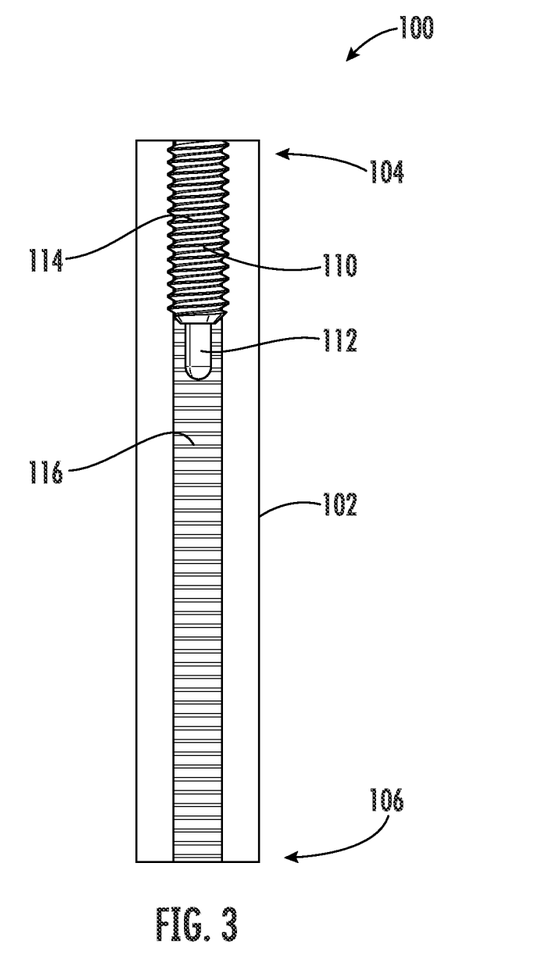
FIG. 3 is a sectional view of the gamma source device of FIG. 2 with a gamma source in an upper position.
Figure 4:
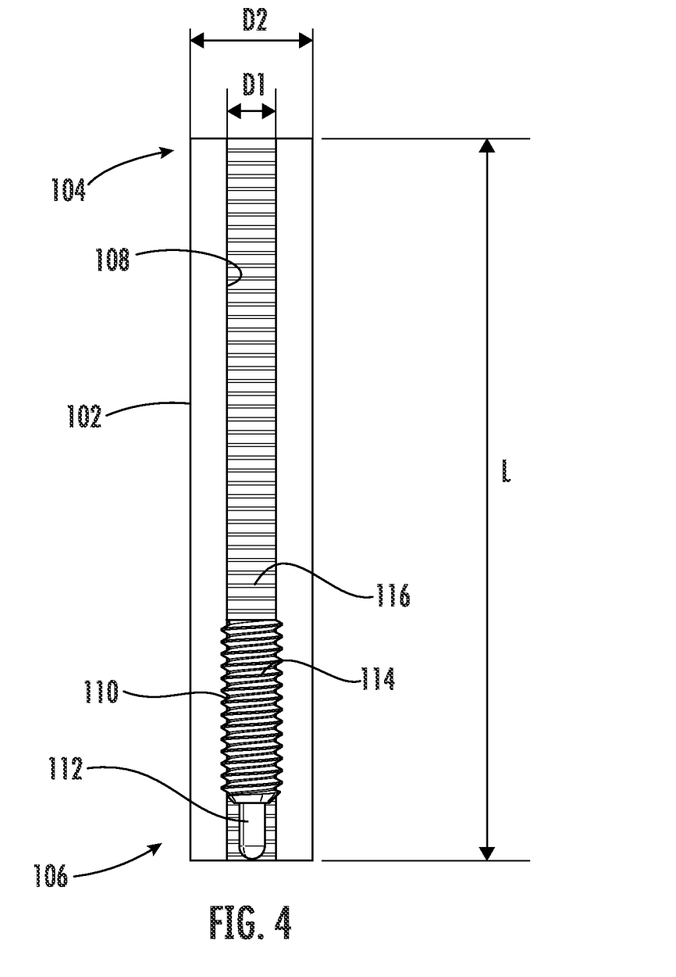
FIG. 4 is a sectional view of the gamma source device of FIG. 2 with the gamma source in a lower position.

A single gamma source device 100 according to some embodiments is illustrated in FIGS. 2-4. The illustrated gamma source device 100 includes a hollow tube or cylinder 102. The tube 102 includes an inner diameter D1 and an outer diameter D2. The tube 102 includes a first end 104 and an opposite second end 106. The inner diameter D1 defines a channel 108.

The device 100 includes a gamma source holder 110 in the inner diameter D1 of the tube 102. The gamma source holder 110 is configured to receive and hold a gamma source 112.

As described in more detail herein, the gamma source holder 110 and the gamma source 112 are configured to be positioned in a plurality of different positions in the channel 108 of the tube 102 between the first end 104 and the second end 106 thereof, thereby varying the solid angle between the gamma source and the detector(s). For example, the gamma source holder 110 and the gamma source 112 may be moved to a plurality of different positions in the channel 108 between an upper position at the first end 104 of the tube 102 (FIG. 3) and a lower position at the second end 106 of the tube 102 (FIG. 4).

An adjustment mechanism is operable to move the gamma source holder 110 and the gamma source 112 in the channel 108 of the tube 102.

In some embodiments, the gamma source holder 110 is a screw or a screw member. As shown in FIGS. 3 and 4, the screw member 110 may include threads 114 that are threadingly engaged with threads 116 on the inner diameter D1 or the channel 108 of the tube 102.

Figure 5:
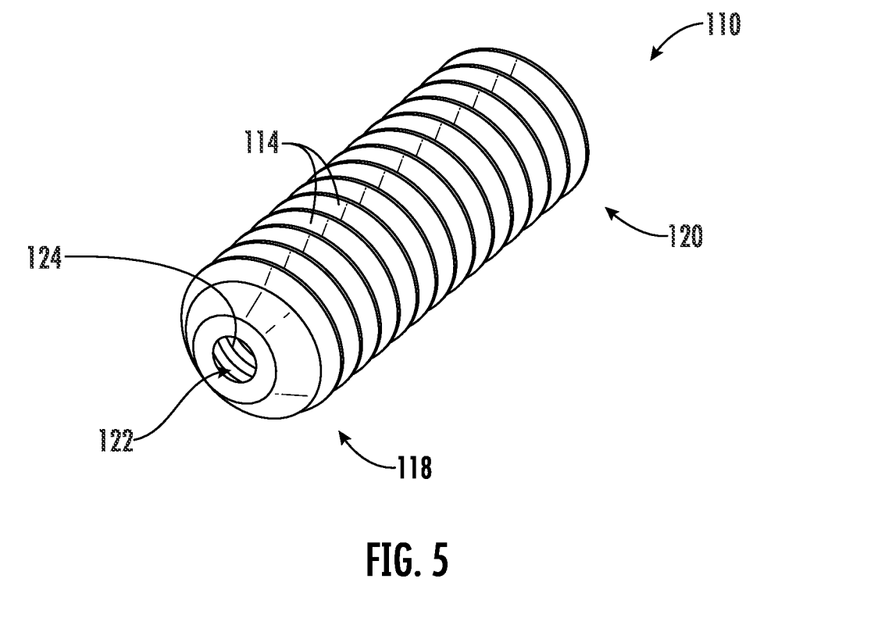
FIG. 5 is a perspective view of a gamma source holder of the gamma source device of FIG. 2.
Figure 6:
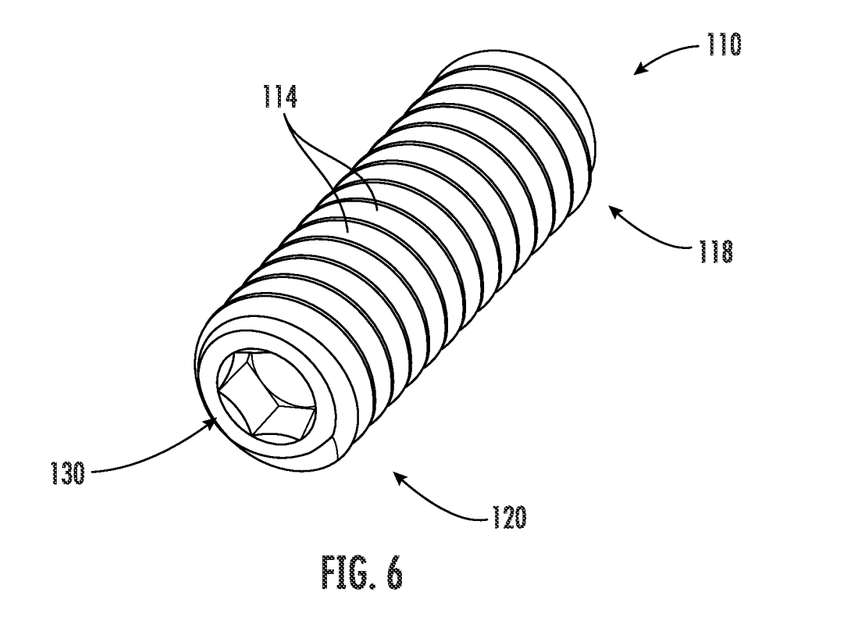
FIG. 6 is another perspective view of the gamma source holder of the gamma source device of FIG. 2.

Turning to FIGS. 5 and 6, the illustrated gamma source holder 110 includes a first end 118 and an opposite second end 120. The first end 118 may be configured to receive the gamma source 112 (FIG. 7).

The first end 118 of the gamma source holder 110 may include an aperture or channel 122. The aperture 122 may include threads 124.

Figure 7:
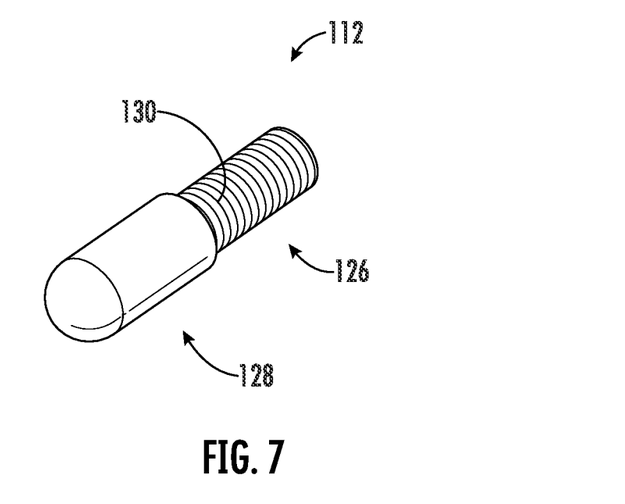
FIG. 7 is a perspective view of a gamma source of the gamma source device of FIG. 2.

The gamma source 112 according to some embodiments is illustrated in FIG. 7. The gamma source includes a stem 126 and a head 128. The stem 126 may include threads 130. In some embodiments, the gamma source 112 is or includes a barium pellet.

Referring to FIGS. 5 and 7, the stem 126 of the gamma source 112 may be received in the aperture 122 of the gamma source holder 110. In some embodiments such as the illustrated embodiments, the stem 126 is threadingly engaged with the aperture 122.

Referring to FIG. 6, the second end 120 of the gamma source holder 110 may include a recess or socket 130. The recess 130 is configured to receive a tool or other control to rotate the gamma source holder 110 to selectively move the gamma source holder 110, and hence the gamma source 112, within the channel 120 of the tube 102 (FIGS. 3 and 4), thereby varying the solid angle relationship between the single gamma source 112 and the detector(s) 12. In the illustrated embodiments, the recess 130 has a hexagonal shape and configured to receive a socket wrench or Allen wrench. In some embodiments, the recess 130 includes one or more elongated slots and is configured to receive screwdriver. Those of ordinary skill will understand that such examples are merely illustrative, and other known mechanisms for rotating the gamma source holder 110 may be used according to the present disclosure.

Figure 8:
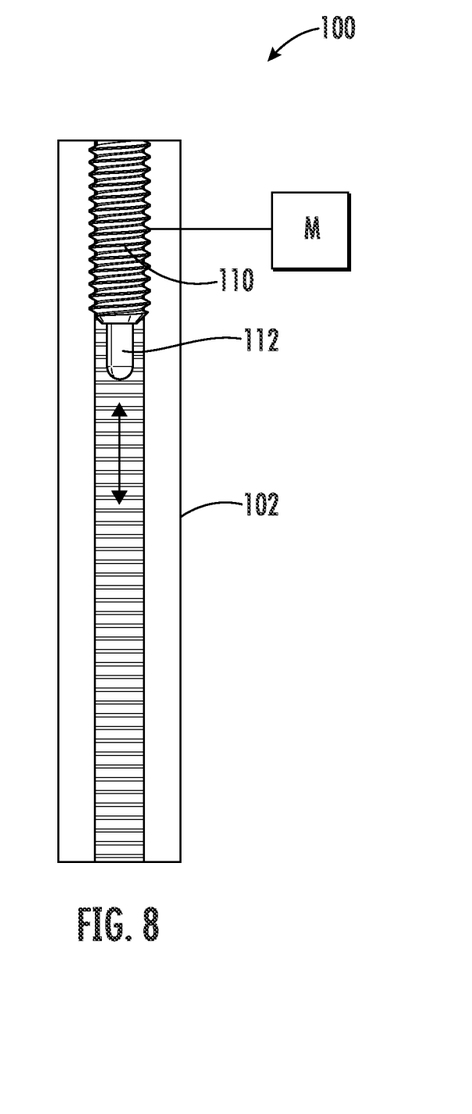
FIG. 8 is a sectional view of a gamma source device according to some other embodiments.

In some other embodiments, and referring to FIG. 8, rather than manually moving the gamma source holder 110, a motor M may be operatively connected to the gamma source holder 110 and configured to move the gamma source holder 110 up and down among the plurality of different positions in the tube 102.

Referring again to FIG. 2, at least one scale 132 including graduations 134 may be on the tube 102. The graduations 134 (also referred to herein as % CPM positions or % markings) may represent expected count rates by the detector 12 of the gamma counter 10 (FIG. 1A) when the device 100 is in the detector 12.

In some embodiments, the scale 132 includes first and second scales 132A, 132B. The first scale 132A may include first graduations 134A representing expected, known, or characteristic count rates by a detector of a first type at various, identified solid angle relationships between the gamma source 112 and the detector(s) 12. The second scale 132B may include second graduations 134B representing expected, known, or characteristic count rates by a detector of a different, second type at the same solid angles.

In some embodiments, the tube 102 is transparent or translucent to allow a user to view the position of the gamma source 112 through the tube 102. This allows the user to align the gamma source 112 with one of the graduations 134 of the scale 132, hence achieving one or more of the identified solid angle relationships between the gamma source 112 and the detector(s) 12. The tube 102 may be polymeric.

Although the scale 132 is shown adjacent the tube 102 in FIG. 1, it will be understood that the scale 132 could be on a label affixed to the tube 102. Alternatively, the scale 132 may be (permanently) printed on the tube 102.

Referring to FIG. 4, the outer diameter D2 of the tube 102 may be between 10 mm and 30 mm. The outer diameter D2 of the tube 102 is sized such that the gamma source device 100 is configured to be received in a detector 12 of a gamma counter 10 (FIG. 1A) or in one of the test tube holders 22 (FIG. 1i).

For example, according to some of the illustrated embodiments, a length L of the tube 102 is between 60 mm and 100 mm, between 70 mm and 90 mm, between 70 mm and 80 mm, and about 75 mm. Those of ordinary skill will understand that the present disclosure is not limited to the tube 102 configuration disclosed, and thus similarly not limited to any physical characteristics of such tube 102.

In some embodiments, the device 100 is provided with an electronic or paper chart for recording an expected count rate for the gamma source 112 at various identified solid angles represented by the positions in the tube 102 (e.g., at each graduation 134 on the scale 132). Such a calibration sheet may include the expected count rate at a particular emission rate for the given solid angle, as well as the expected count rate when the gamma source is moved to the other various graduations representing other identified solid angle relationships between the gamma source 112 and detector(s) 12. In some embodiments, a spreadsheet calculates the expected count rates and may be configured to automatically decay correct the gamma source activity and display the expected count rate.

Figure 9:
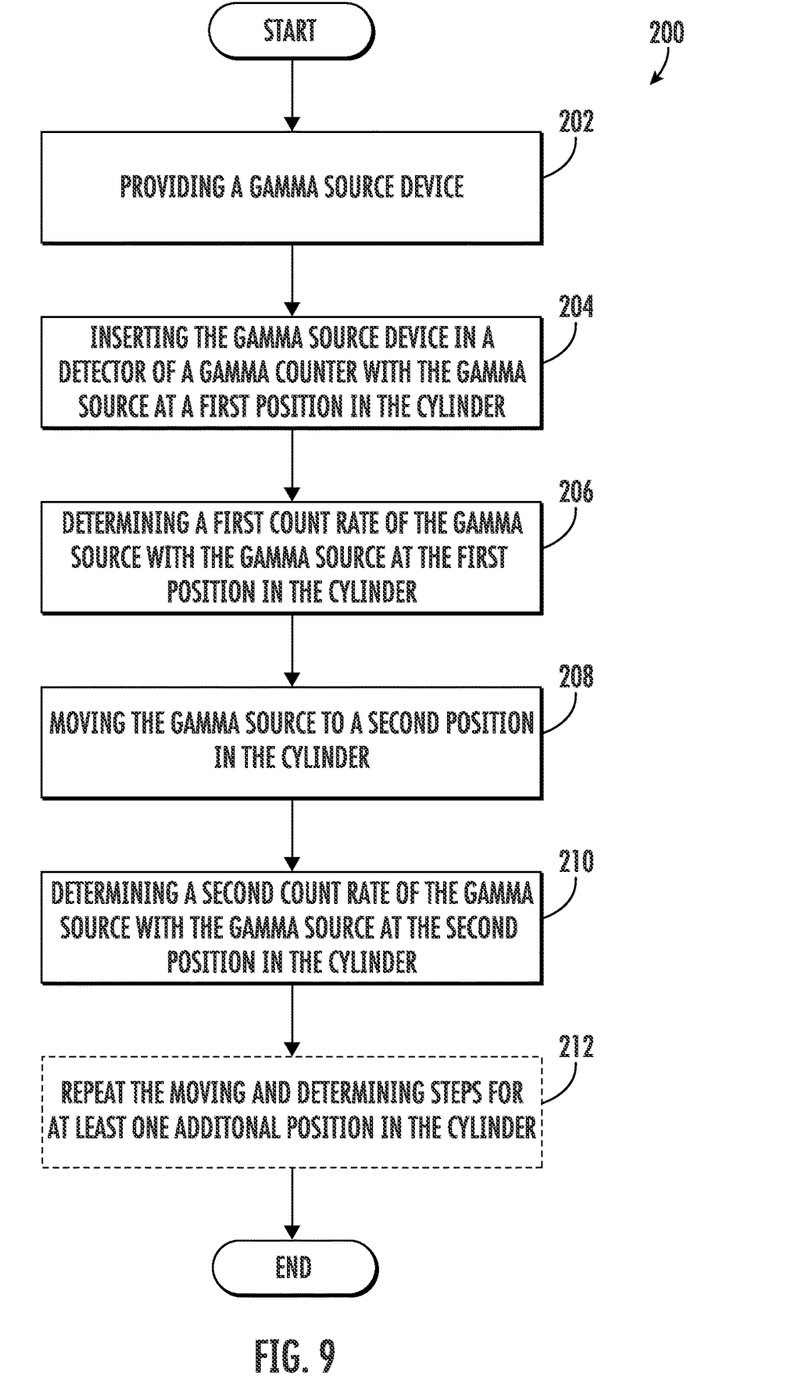
FIG. 9 is a flowchart illustrating methods according to some embodiments.

FIG. 9 is a flowchart illustrating a method of determining the count rate linearity of one or more detectors of a gamma counter, according to some embodiments. Referring to FIGS. 1-4 and 9, the method 200 includes providing a gamma source device as described herein (Block 202). For example, the gamma source device 100 may include a cylinder 102, a gamma source holder 110 in the cylinder 102, and a gamma source 112 connected to the gamma source holder 110. The gamma source holder 110 and the gamma source 112 are configured to be moved to a plurality of different positions in the cylinder 102.

In an illustrated embodiment, the method includes inserting the gamma source device 100 in a detector 12 of the gamma counter 10 with the gamma source 112 at a first position in the cylinder 102 (Block 204). The method includes determining a first count rate of the gamma source 112 with the gamma source 112 at the first position in the cylinder 102 using the gamma counter 10 (Block 206).

The method includes moving the gamma source 112 to a second position in the cylinder 102 (Block 208). The method includes determining a second count rate of the gamma source 112 with the gamma source 112 at the second position in the cylinder 102 using the gamma counter 10 (Block 210).

In some embodiments, the method includes comparing the first count rate to a first expected count rate and comparing the second count rate to a second expected count rate.

In some embodiments, the method includes moving the gamma source 112 to at least one addition position in the cylinder and determining a count rate of the gamma source 112 at each of the at least one additional position(s) (Block 212).

For example, the method may include, after determining the second count rate: moving the gamma source 112 to a third position in the cylinder 102; and determining a third count rate of the gamma source 112 with the gamma source 112 at the third position in the cylinder 102 using the gamma counter 10. The method may include, after determining the third count rate: moving the gamma source 112 to a fourth position in the cylinder 102; and determining a fourth count rate of the gamma source 112 with the gamma source 112 at the fourth position in the cylinder 102 using the gamma counter 10.

The method may include comparing the third count rate to a third expected count rate and/or comparing the fourth count rate to a fourth expected count rate.

The gamma source 112 may be moved to more than four positions in some embodiments.

In some embodiments, the gamma source holder includes a screw that is threadingly engaged with an inner diameter of the cylinder, and moving the gamma source to the second position (or the third position and/or the fourth position) includes rotating the screw. Rotating the screw may include rotating the screw using a hand tool.

In some embodiments, after determining the first count rate, the method includes: removing the gamma source device from the detector; and, after rotating the screw, reinserting the gamma source device in the detector of the gamma counter with the gamma source at the second position (and/or the third position and/or the fourth position) in the cylinder.

The cylinder may be transparent or translucent and include a scale including a plurality of graduations, and moving the gamma source to the second position (and/or the third position and/or the fourth position) includes moving the gamma source to one of the plurality of graduations.

In some embodiments, the gamma counter 10 includes a plurality of detectors 12. The method may include: inserting the gamma source device 100 into at least some of the plurality of detectors 12 to be tested; and determining count rates with the gamma source 112 at a plurality of different positions in the cylinder for each detector 12 to be tested.

Example

One embodiment of the disclosed gamma source device 100 was used to check count rate linearity of a 2470 Wizard[2] gamma counter and a 2480 Wizard[2] gamma counter, both available from PerkinElmer Health Sciences, Inc. The position of the gamma source 112 was set to each of the graduations 134 or % CPM positions on the scale 132. Note that the % CPM markings are different on the 2470 and 2480 Wizard[2] instruments. This is due to differences in the detector geometries and thus solid angles.

Figure 10:
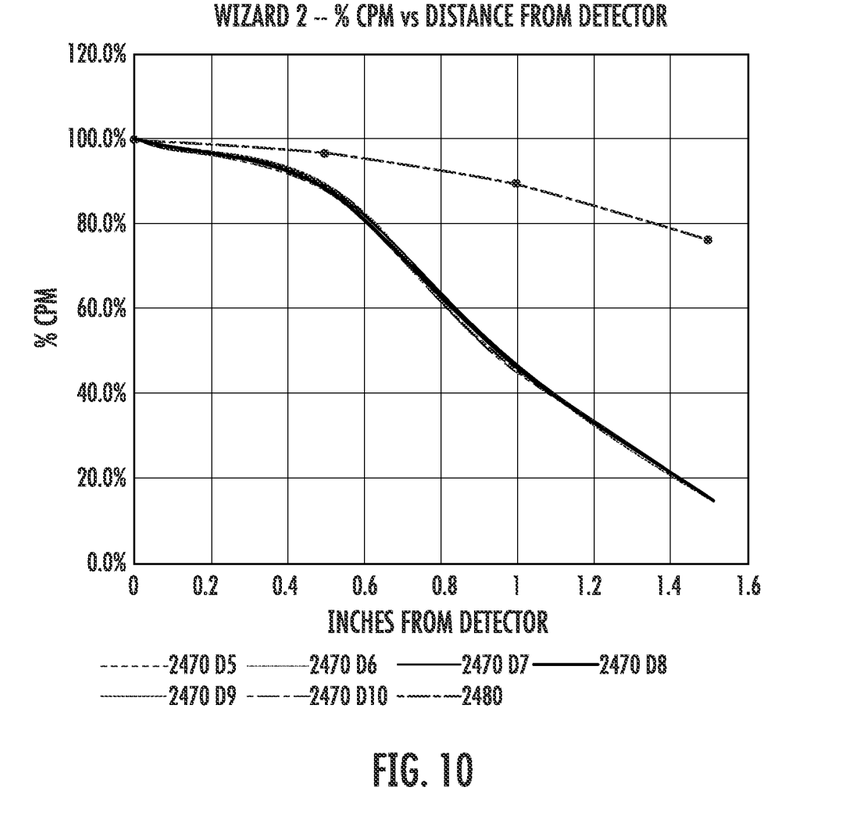
FIG. 10 is a chart illustrating gamma counter count rate test results using the gamma source device of FIG. 2.

The gamma source 112 was counted at each of the % CPM positions and the results confirmed to be within desired tolerances. The gamma source device 100 confirmed that each instrument had sufficient count rate linearity using a single gamma source 112 that was moved to different positions in the tube 102. The results from the tests are included in Table 1 and charted in FIG. 10. Note that the 2470 Wizard[2] gamma counter includes six detectors (D5-D10) and the 2480 Wizard[2] gamma counter includes one detector (2480).

TABLE 1

Count data for six 2470 detectors and one 2480 detector using the present technology with a 133Ba pellet set at four different heights above the detector base.

| position | inches | D5 | D6 | D7 | D8 | D9 | D10 | 2480 |
|---|---|---|---|---|---|---|---|---|
| 1 | 0 | 681286 | 698700 | 685957 | 700516 | 702508 | 702613 | 1001951 |
| 2 | 0.5 | 608793 | 619779 | 609849 | 615480 | 614788 | 614626 | 967526 |
| 3 | 1 | 315335 | 323064 | 320763 | 318972 | 316173 | 315936 | 895938 |
| 4 | 1.5 | 101205 | 106855 | 106308 | 108057 | 106887 | 108885 | 760256 |

The present technology has been described herein with reference to the accompanying drawings, in which illustrative embodiments of the technology are shown. In the drawings, the relative sizes of regions or features may be exaggerated for clarity. This technology may, however, be embodied in many different forms and should not be construed as limited to the embodiments set forth herein; rather, these embodiments are provided so that this disclosure will be thorough and complete, and will fully convey the scope of the technology to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 900 or at other orientations) and the spatially relative descriptors used herein interpreted accordingly.

The present disclosure can be implemented using one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more storage devices capable of being accessed by a processor as provided herein.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices. References herein to (micro) processor instructions or (micro)processor-executable instructions, in accordance with the above, can be understood to include programmable hardware.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Use of such "microprocessor" or "processor" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items. When the term "about" or "substantially equal to" is used in the specification the intended meaning is that the value is plus or minus 5% of the specified value.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present technology are explained in detail in the specification set forth herein.

Unless otherwise defined, all terms (including technical and scientific terms) used herein have the same meaning as commonly understood by one of ordinary skill in the art to which this technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The foregoing is illustrative of the present technology and is not to be construed as limiting thereof. Although a few example embodiments of this technology have been described, those skilled in the art will readily appreciate that many modifications are possible in the example embodiments without materially departing from the teachings and advantages of this technology. Accordingly, all such modifications are intended to be included within the scope of this technology as defined in the claims. The technology is defined by the following claims, with equivalents of the claims to be included therein.

What is claimed is:

1. A method of determining the count rate linearity of one or more detectors of a gamma counter, the method comprising:
   providing a gamma source device comprising a cylinder, a gamma source holder in the cylinder, and a gamma source connected to the gamma source holder, wherein the gamma source holder and the gamma source are configured to be moved to a plurality of different positions in the cylinder;
   inserting the gamma source device in a detector of the gamma counter with the gamma source at a first position in the cylinder;
   determining a first count rate of the gamma source with the gamma source at the first position in the cylinder using the gamma counter;
   moving the gamma source to a second position in the cylinder;
   determining a second count rate of the gamma source with the gamma source at the second position in the cylinder using the gamma counter; and
   determining the count rate linearity of the detector using the first count rate and the second count rate.

2. The method of claim 1 further comprising comparing the first count rate to a first expected count rate and comparing the second count rate to a second expected count rate.

3. The method of claim 1 further comprising, after determining the second count rate:
   moving the gamma source to a third position in the cylinder;
   determining a third count rate of the gamma source with the gamma source at the third position in the cylinder using the gamma counter; and
   determining the count rate linearity of the detector using the first count rate, the second count rate, and the third count rate.

4. The method of claim 3 further comprising comparing the third count rate to a third expected count rate.

5. The method of claim 1 wherein the gamma source holder comprises a screw that is threadingly engaged with an inner diameter of the cylinder, and wherein moving the gamma source to the second position comprises rotating the screw.

6. The method of claim 5 wherein rotating the screw comprises rotating the screw using a hand tool.

7. The method of claim 5 further comprising: after determining the first count rate, removing the gamma source device from the detector; and, after rotating the screw, reinserting the gamma source device in the detector of the gamma counter with the gamma source at the second position in the cylinder.

8. The method of claim 1 wherein the cylinder is transparent or translucent and comprises a scale comprising a plurality of graduations, and wherein moving the gamma source to the second position comprises moving the gamma source to one of the plurality of graduations.

9. The method of claim 1 wherein the gamma counter comprises a plurality of detectors, the method comprising:
   inserting the gamma source device into at least some of the plurality of detectors to be tested;
   and determining count rates with the gamma source at a plurality of different positions in the cylinder for each detector to be tested.

10. A gamma source device comprising:
    a hollow tube comprising an inner diameter and an outer diameter, the hollow tube comprising a first end and an opposite second end; and
    a gamma source holder in the inner diameter of the tube;
    wherein the gamma source holder is configured to receive and hold a gamma source,
    wherein the gamma source holder and the gamma source are configured to be positioned in a plurality of different positions in the tube between the first end and the second end, and
    wherein the outer diameter of the tube is sized such that the gamma source device is configured to be received in a detector of a gamma counter.

11. The gamma source device of claim 10 wherein the gamma source holder comprises a screw member threadingly engaged with the inner diameter of the tube.

12. The gamma source device of claim 11 wherein the screw member comprises a first end and an opposite second end, and wherein the first end of the screw member is configured to receive the gamma source.

13. The gamma source device of claim 12, wherein the first end of the screw member comprises a threaded aperture, and wherein the aperture is configured to threadingly engage the gamma source.

14. The gamma source device of claim 12, wherein the second end of the screw member comprises a recess configured to receive a tool to rotate the screw member to thereby selectively move the screw member among the plurality of different positions in the tube.

15. The gamma source device of claim 10 further comprising a motor operatively connected to the gamma source holder and configured to move the gamma source holder among the plurality of different positions in the tube.

16. The gamma source device of claim 10 further comprising a scale comprising graduations on the tube, wherein the graduations correspond to at least some of the plurality of different positions in the tube and represent expected count rates by the detector of the gamma counter.

17. The gamma source device of claim 16, wherein the scale comprises first and second scales, the first scale including graduations representing expected count rates by a detector of a first type of gamma counter, the second scale including graduations representing expected count rates by a detector of a second type of gamma counter.

18. The gamma source device of claim 16 wherein the tube is transparent or translucent to allow a user to view the position of the gamma source through the tube.

19. The gamma source device of claim 10 wherein the outer diameter of the tube is between 10 mm and 30 mm.

20. The gamma source device of claim 10 wherein the tube has a height or length of between 60 mm and 100 mm.

* * * * *

UNITED STATES PATENT AND TRADEMARK OFFICE
CERTIFICATE OF CORRECTION

PATENT NO. : 12,210,128 B2
APPLICATION NO. : 18/176683
DATED : January 28, 2025
INVENTOR(S) : Belobraydich et al.

Page 1 of 1

It is certified that error appears in the above-identified patent and that said Letters Patent is hereby corrected as shown below:

In the Specification
Column 7, Line 13: Please correct "FIG. 1*i*" to read --FIG. 1B--

Signed and Sealed this
Fifteenth Day of July, 2025

Coke Morgan Stewart
*Acting Director of the United States Patent and Trademark Office*